March 20, 1951 H. ERNST 2,546,062
TORQUE CONVERTER
Filed Dec. 28, 1945 4 Sheets-Sheet 1

INVENTOR.
HANS ERNST
BY
Harold K. Parsons + Leigh W. Wright
ATTORNEYS

INVENTOR.
HANS ERNST
BY Harold K. Parsons + Leigh W. Wright
ATTORNEYS

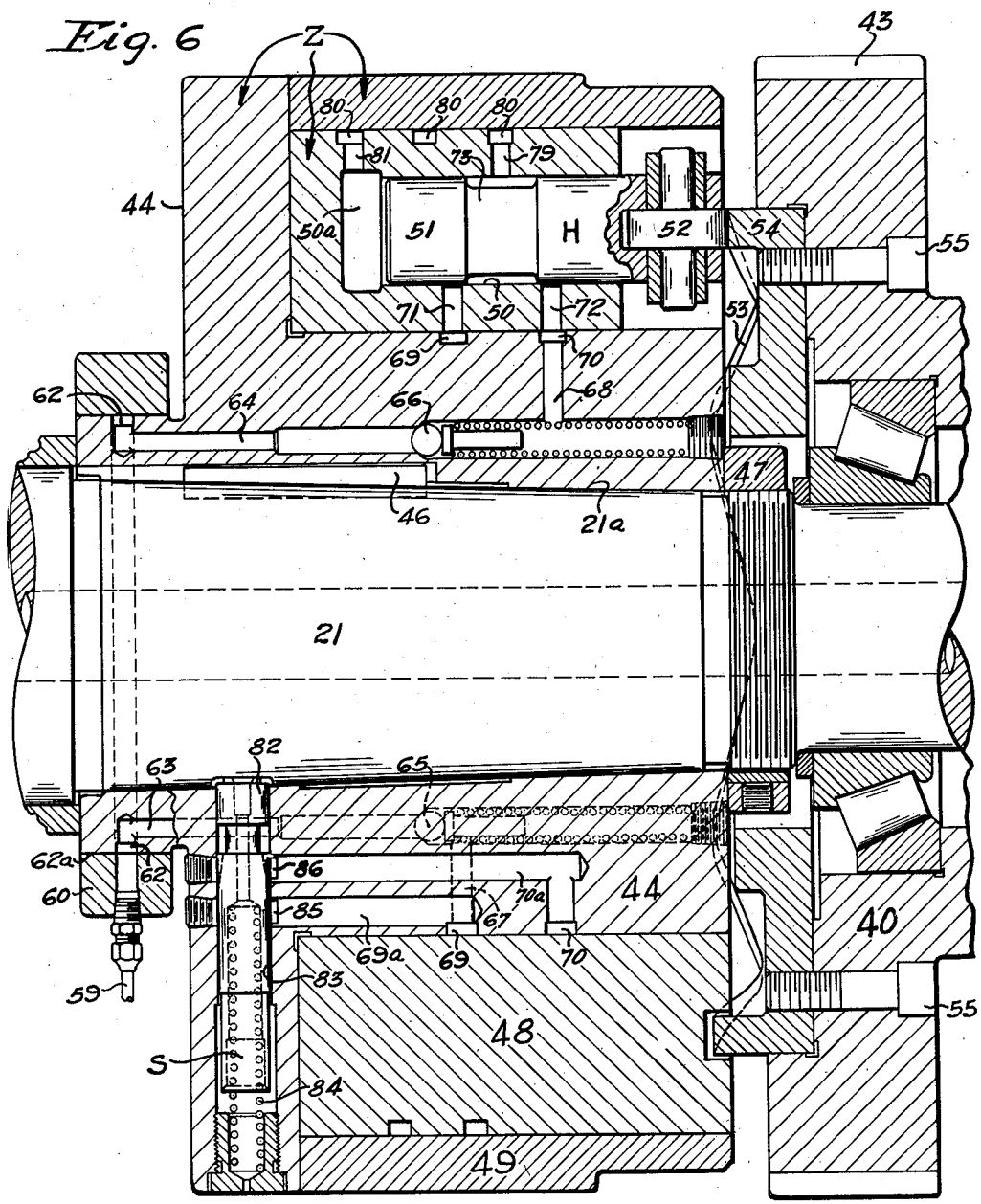

March 20, 1951 H. ERNST 2,546,062
TORQUE CONVERTER
Filed Dec. 28, 1945 4 Sheets-Sheet 4
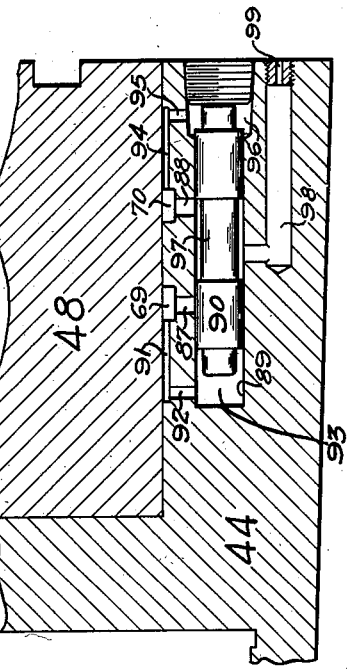
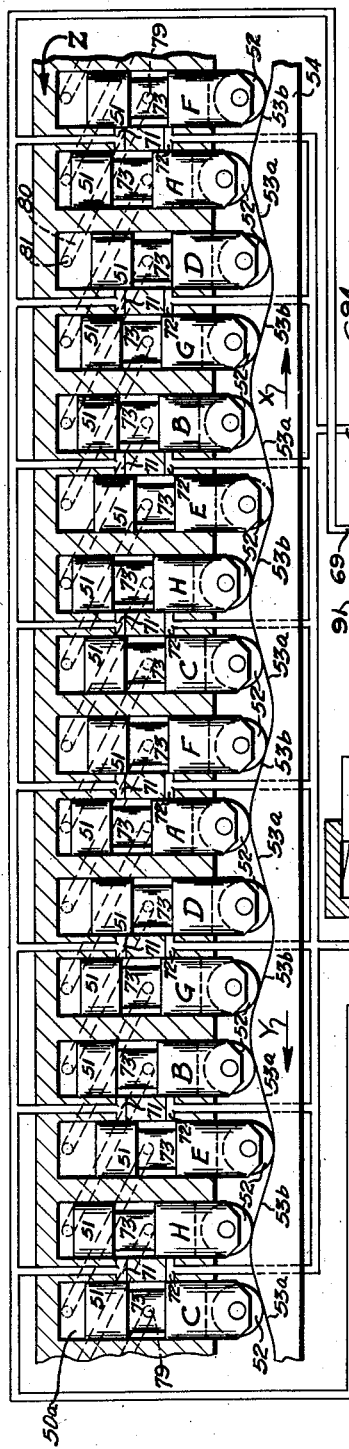
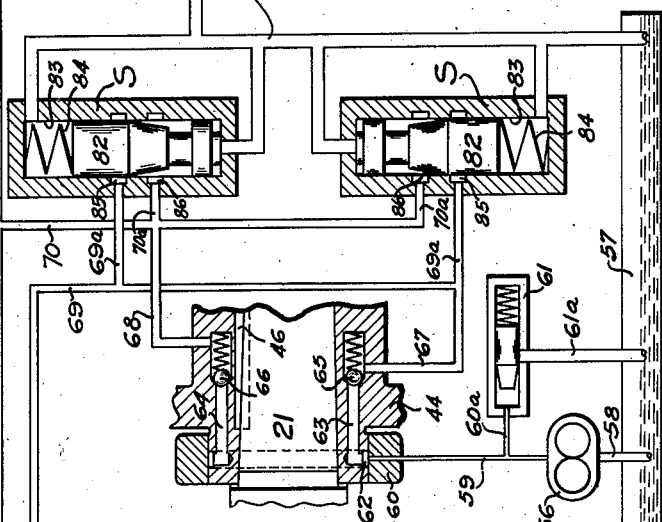
INVENTOR.
HANS ERNST
BY
Harold K. Parsons + Leigh W. Wright
ATTORNEYS Patented Mar. 20, 1951

2,546,062

UNITED STATES PATENT OFFICE 2,546,062

TORQUE CONVERTER

Hans Ernst, Cincinnati, Ohio, assignor to The Cincinnati Milling Machine Co., Cincinnati, Ohio, a corporation of Ohio Application December 28, 1945, Serial No. 637,720

16 Claims. (Cl. 192—59)

This invention relates to improvements in machine tool drives and is practically related to a novel and improved form of drive mechanism for a milling machine cutter spindle.

In machine tools of this type the cutter spindle is customarily driven directly by a change speed gear transmission actuated by a suitable constant speed prime mover or motor. When this direct gear drive is utilized to rotate the cutter spindle certain disadvantages are encountered due to the fact that a milling cutter on the spindle is formed with a plurality of cutting teeth which intermittently engage the work piece during the cutting operation. This intermittent cutting action between work and tool results in an irregular transmission of power through the drive gearing due to the tendency of the spindle to jump ahead between cuts and the momentary retardance as a new tooth operatively engages the work.

The irregular non-uniform rotation of the cutter spindle relative to the uniform rotation of the prime mover is due to the necessary deflections and clearances between the various driving elements in the change gear transmission with the result that at certain feeds and speeds considerable vibration or chatter is produced in the driving mechanism and undue strain exerted on the power transmitting gears. Also, this intermittent action tends to produce objectionable noise during the operation of the machine and also makes it difficult to produce accurately finished work surfaces.

It is, therefore, one of the objects of this invention to provide a machine tool spindle drive embodying a vibration dampener which will minimize the vibration of intermittent engagement between cutter and work being transmitted in a positive manner to the gear transmission to thus avoid setting up recurrent strain, chattering, and the like in the transmission mechanism.

A further object of this invention is the provision of an improved self-contained hydraulic shock absorber mechanism for use in power transmissions.

Another object is to provide a vibration dampening or yielding hydraulic coupling mechanism for regulating the drive connection between the driving and driven members of a power transmission system.

A further object is to provide a hydraulic slip coupling for a power transmission which automatically varies the rate of slip between the driving and driven elements of the transmission in response to variations in the speed of rotation of the coupling.

Other objects and advantage of the present invention should be readily apparent by reference to the following specification, considered in conjunction with the accompanying drawings forming a part thereof and it is to be understood that any modifications may be made in the exact structural details there shown and described, within the scope of the appended claims, without departing from or exceeding the spirit of the invention.

Throughout the several views of the drawings similar reference characters are employed to denote the same or similar parts:

Figure 6 is a diagrammatic view of the hydraulic coupling on the line 6—6 of Figure 2.

Figure 7 is an enlarged fragmentary section on the line 7—7 of Figure 2.

Figure 8 is a diagram of the hydraulic operating and control circuit for the coupling.

Figure 1:
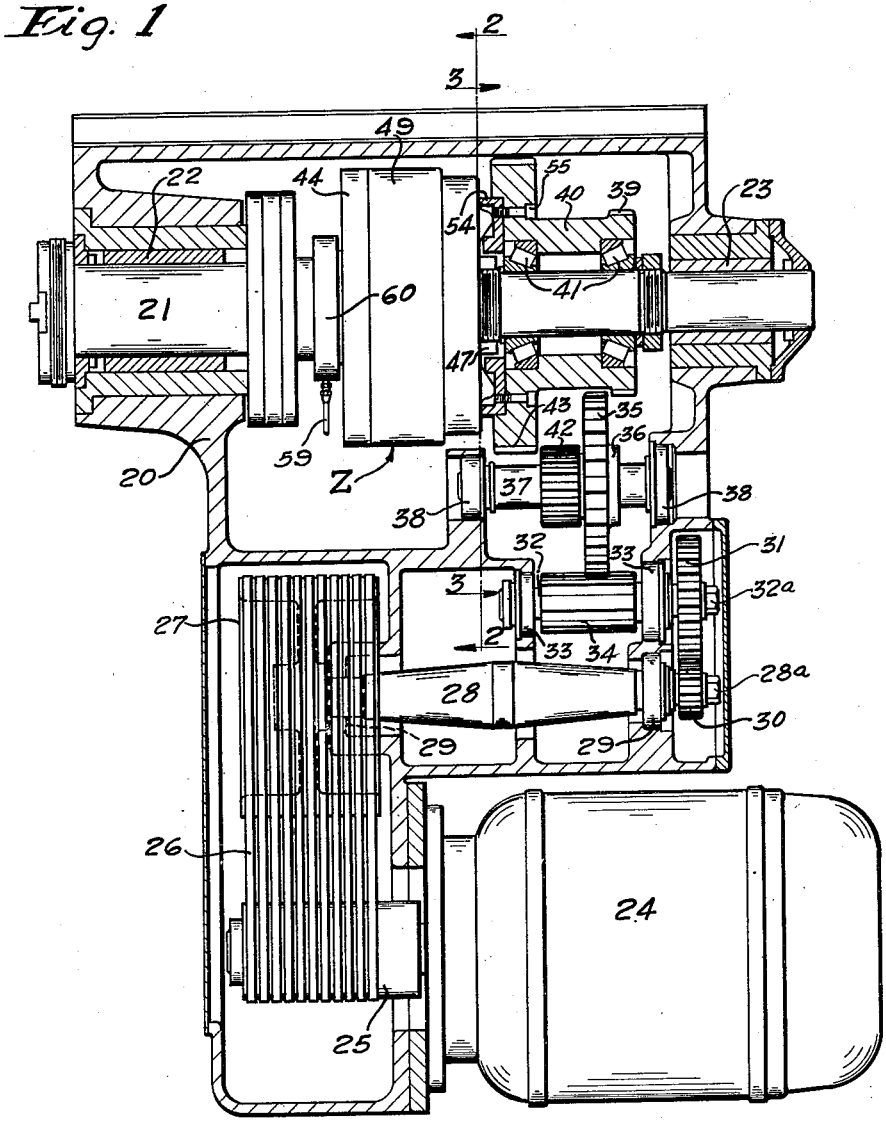
Figure 1 is a diagrammatic section of a milling machine spindle driving transmission incorporating the features of this invention.

As illustrative of an application to which this invention is particularly adapted, there is shown a milling machine spindle drive, Figure 1, comprising a frame 20 in which is journaled the cutter spindle 21 in appropriate bearings 22 and 23. The cutter spindle is driven by means of a prime mover or electric motor 24 which has a motor pulley 25 over which operates the belts 26 to drive the pulley 27 fixed on a shaft 28 suitably journaled in appropriate bearings 29 carried in the housing 20. The shaft 28 is arranged to have a change or pick-off gear 30 demountably fastened to its end 28a which drives a mating change or pickoff gear 31 demountably carried on the end 32a of the shaft 32 journaled on appropriate bearings 33 carried in the housing 20. An elongated gear 34 is formed on the shaft 32 and is arranged in constant driving relationship with the gear 35 of a compound gear 36. This compound gear is axially slidable on a shaft 37 carried in suitable bearings 38 in the housing 20 so as to engage the gear 35 selectively with a gear 39 formed on the compound gear 40 journaled on suitable bearings 41 mounted against axial movement on the cutter spindle 21. A second gear 42 formed on the compound gear 36 is adapted to be engaged with the gear 43 formed on the compound gear 40 when shifted axially on a shaft 37 in the opposite direction from that when engaging the gear 35 with the gear 39.

In this arrangement there is provided a series of speed changes which may be obtained by the proper selection of pickoff gears 30—31 and by appropriately shifting the compound gear 36 for either engagement of its gear 35 with the gear 39 for higher speed rotation of the cutter spindle or by engagement of the gear 43 with the gear 42 of the compound gear 40 for slower rotation of the spindle. In this way, a constant speed motor 24 may be utilized and it is also preferable to provide reversible mechanism for the motor 24 for obtaining either direction of rotation for the cutter spindle 21.

The compound gear 40 is connected to drive the cutter spindle through a hydraulic coupling comprising a main body portion 44 which is connected to positively drive the cutter spindle 21 through a suitable key 45, Figure 6, and rigidly held on the tapered portion 21a of the spindle by the clamping nut 47. Also rigidly fixed to the body portion 44 is the annular piston plunger carrying member 48 around which is also rigidly fixed the outer enclosure ring 49 so that in effect the members 44, 48, and 49 comprise an integral body portion or runner Z of the coupling which rotates positively with the cutter spindle 21.

In the annular member 48 of the hydraulic coupling body is provided a series of cylinder bores 50 in which are mounted a series of piston plungers 51. In the outer ends of each of these plungers is provided a roller 52 which engages the undulated cam surface 53 of the driving cam or impeller 54 for the coupling. This cam is rigidly attached to the compound gear 40 by suitable screws 55. Relative rotation of the gear 40 with respect to the cutter spindle 21 causes the cam surface 53 to reciprocate the various plunger pistons 51 in the bores 50.

The driving power from the compound gear 40 through the fluid coupling to the cutter spindle 21 is provided by sustained hydrostatic pressure reacting against the piston plungers 51 as they are mechanically actuated by the cam 54. The source of fluid pressure for this system is provided by a hydraulic pump 56, Figure 8, which receives fluid from reservoir 57 through the suction line 58 and transmits the fluid under pressure to the line 59 which has a branch line 60a connected to a pressure relief valve 61 having a discharge line 61a for return of fluid back to the reservoir 57 so as to maintain a desired predetermined operating pressure in the line 59.

Figure 5:
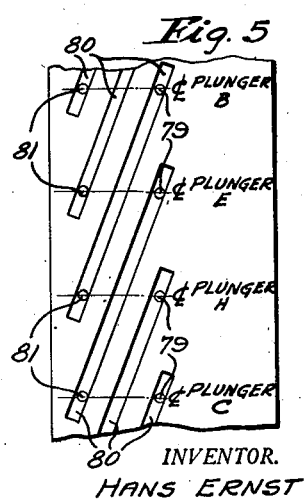
Figure 5 is a fragmentary view indicated by the line 5—5 in Figure 2.

The pressure supply line 59 from the pump is connected to an oil conductor ring 60, Figures 6 and 8, which is journaled on a suitable bearing surface 62a provided on the member 44 of the coupling Z. An annular groove forming a fluid passageway 62 is provided in the surface 62a in such a way as to be constantly supplied with fluid pressure from the line 59 during rotation of the cutter spindle 21. Passageways 63 and 64 formed in the member 44 of the coupling are connected to the respective check valves 65 and 66 which allow free flow of fluid from passageway 63 to the passageway 67 and from the passageway 64 to the passageway 68 while preventing flow in the opposite direction between the passageways. The passageways 67 and 68 extend radially outwardly and communicate respectively with the annular grooves 69 and 70 formed in the member 44 of the coupling. A pair of radially disposed ports 71 and 72 for each of the cylinder bores 50 are formed in the member 48 of the coupling and are connected with the respective annular grooves 69 and 70. Annular grooves 73 formed in each of the plungers 51 are arranged to be alternately connected with the ports 71 or with the ports 72 upon reciprocation of the plungers by the cam 54. The groove 73 is at all times in communication with the ports 79 which are connected through the passageways 80 and 81, Figure 5, to the pressure chambers 50a behind each piston plunger. Each plunger thus serves as the valve control means for another valve plunger 90° out of phase with operating plunger, which is two plungers away, to alternately connect the corresponding pressure chamber to the ports 71 or 72 as the plungers are reciprocated by the undulated surfaces 53 of the cam 54 during relative rotation of the gear 40 and the coupling Z.

A pair of radially disposed slip control valves S are provided to interconnect the passageways 69 and 70. Each of these valves has a plunger 82 movable radially of the axis of rotation of the coupling Z in a bore 83 formed in the member 44. The plungers are normally urged radially inwardly by compression springs 84. Inward movement of the plungers tends to close off ports 85 from ports 86 which are respectively connected through passageways 69a and 70a with the passageways 69 and 70. Outward movement of the plungers tends to open ports 85 to allow a restricted flow through the valves S between the passageways 69 and 70.

With the compound gear 40 rotating to drive the coupling and cutter spindle, as for instance, in the direction indicated by the arrow X, Figure 8, the cam 54 actuates the plungers so that they function as a pump, permitting fluid to enter from passageway 70 under pressure from pump 56, through port 72, and discharging fluid out through port 71, passageway 69, passageway 69a, through the slip control valves S, when open, and the passageway 70a back to the passageway 70. Rotation of the gear 40 in the opposite direction as indicated by the arrow Y in Figure 8, will reverse the flow in the passageways 69 and 70 and the slip control valves S, the operation of the coupling being otherwise the same for either direction of rotation imparted to it by the motor 24.

A predetermined minimum fluid pressure is at all times maintained in the passageways 69 and 70 and the associated ports 71 and 72 by the pump 56 which supplies fluid through the check valves 65 and 66, the relief valve 61 maintaining the desired pressure. This fluid pressure supply circuit from pump 56 serves to charge the cylinder chambers 50a during their connection with the supply grooves 70, thus maintaining the plungers with the rollers 52 in proper operative contact with the undulated surface 53 of the cam 54. This supply of fluid also compensates for any leakage from the operating circuit associated with the piston plungers.

Figure 2:
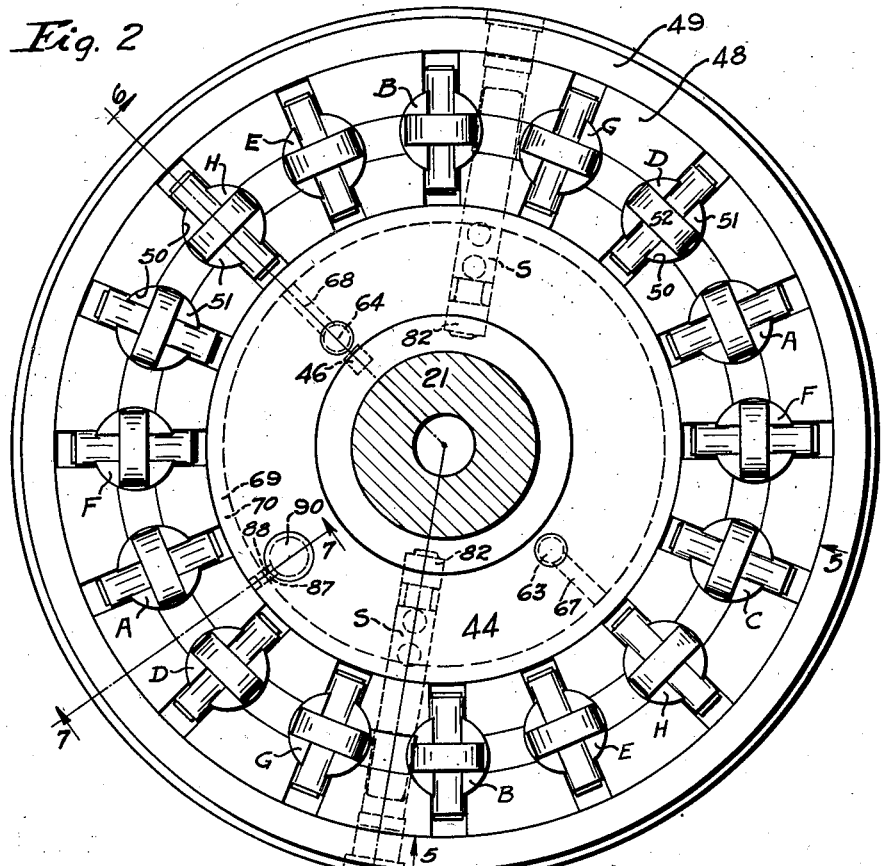
Figure 2 is an enlarged transverse section through the vibration dampener or hydraulic coupling indicated on the line 2—2 in Figure 1.
Figures 3, 4:
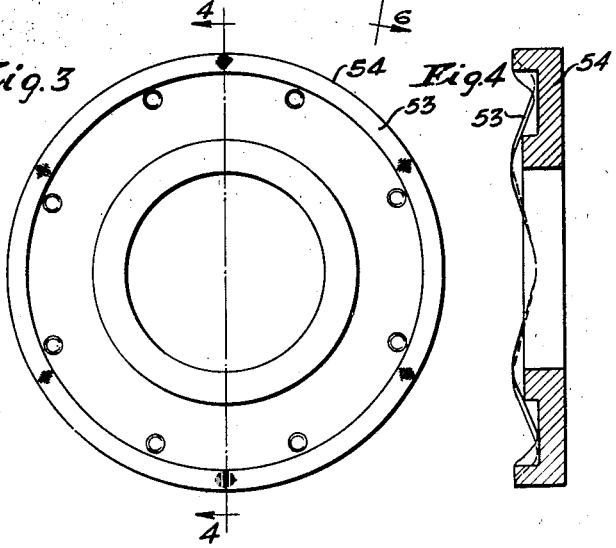
Figure 3 is a face view of the actuating cam of the coupling indicated by the line 3—3 in Figure 1.
Figure 4 is a section on the line 4—4 of Figure 3.

The cam 54 is so arranged that upon its rotation relative to the member 48 of the coupling, diametrically oppositely located piston plungers, such as the plungers A, Figures 2 and 8, are actuated simultaneously to the same positions in their reciprocating cycles. With the cam 54 rotating in the direction X relative to the coupling and cutter spindle, the plungers A (Figure 8) will begin their downward stroke under pressure from the fluid supplied through the ports 72 connected to the plungers C by riding down on the cam surfaces 53a, Figure 8, passing through the various stages indicated by the plungers B, C, D, and E. During this time the corresponding valve controlling plungers C, D, E, F, and G are so positioned as to connect the cylinder chambers 50a of the plungers A to E, inclusive to the ports 72 to allow fluid pressure from the pump 56 to pass through the check valve 65 and the passageway 70 to charge the chambers 50a with fluid preparatory to the beginning of the compression stroke. As the plungers arrive at the stage indicated by plungers E the suction stroke has been completed and the corresponding valve control plungers G have cut off communication of the chambers 50a with the ports 72.

Continued rotation of the cam 54 relative to the coupling causes the plungers to ride up on the surfaces 53b of the cam in compression stroke through stages E, F, G, and H back to the stage indicated by plungers A to complete their reciprocating cycle. During this compression stroke the corresponding valve control plungers G, H, A, and B are so positioned as to connect the chambers 50a to ports 71 so that fluid is thus forced out into the passageway 69 from which it is conveyed through the slip control valves S back to the passageway 70 for return of fluid to the piston plungers. It will be apparent that upon rotation of the cam 54 in the opposite direction Y the same mode of operation of the plungers will take place except that the fluid will be circulated in the opposite direction through the passageways 69 and 70 and the slip control valves S, fluid being supplied from pump 56 to the circuit through the check valve 66 at this time.

Were it not for the restriction to flow between the passageways 69 and 70 imposed by the slip control valves S the cam 54 would freely rotate relative to the coupling member 48 merely actuating the plungers to circulate fluid between the passageways 69 and 70. However, when the plungers 82 of the valve S are in the position shown in Figure 8 they restrict flow at the ports 85 and pressure will build up in the chambers 50a behind the piston plungers 51 operating in compression stroke to thus restrict the free movement of the piston plungers by the cam 54. For instance, with the valve plunger 82 set to completely block the ports 85 the piston plungers in compression stroke would be hydraulically locked against movement with the result the cam 54 will then drive the coupling and cutter spindle at the same speed at which it is rotating. By conventional change of design of the valve plungers 82 or use of end stops, now shown, it is obvious the position of the valve plungers 82 relative to the ports 85 the flow between the passageways 69 and 70 may be so regulated prior to automatic adjustment as to provide any desired slip between the cam 54 and the coupling and cutter spindle as the transmission is being driven by the motor 24.

The valve plungers 82 of the slip control valves S are arranged to be automatically regulated in accordance with the speed of rotation of the coupling. The radial positioning of the valve plungers 82 renders them responsive to the rate of rotation of the coupling so that increased speed of coupling rotation causes the plungers to move radially outwardly compressing the springs 84 and opening the ports 85. Decreased speed of rotation will cause the springs 84 to move the plungers 82 radially inwardly to close off the ports 85. Thus in this arrangement increased cutter spindle speeds automatically increase the slip through the coupling while decreased spindle speeds automatically decrease the slip through the coupling. The slip control valves S automatically adjust themselves to the speed selected for the cutter spindle by the change gears 30—31 and the shifting of the compound gear 36 so as to provide the desired slip in the coupling C for the speed selected.

Preferably the coupling is controlled by the valves S so as to provide a maximum slip of about two percent when operated at the highest speed and with substantially no slip when operating at the lowest speed in order to maintain the proper torque output to the cutter spindle through the entire speed range of the transmission. The fluid in the chambers 50a behind the piston plungers 51 serves as a yieldable cushion between the transmission and the cutter spindle as it escapes through the slip control valves S, to absorb any vibration or disturbing intermittent forces which would otherwise be intercommunicated between the transmission and coupling.

In order to dissipate heat developed in the coupling resulting from compression of the fluid in the chambers 50a and the passage of the fluid through the valves S, an arrangement is provided to continuously circulate a small quantity of fluid from the pump 56 through the coupling passageways 69 or 70, and back to the chambers 50a. Connecting with the annular grooves 69 and 70 in the member 44, at a point removed from the passageways 67 and 68 supplying these grooves, are the ports 87 and 88, Figures 2, 7, and 8, which communicate with the bore 89 in which is slidably carried the shuttle valve plunger 90. This plunger is adapted to be actuated by fluid pressure from the passageways 69 and 70. Passageway 69 is connected through passageways 91 and 92 to the pressure chamber 93 behind one end of the plunger 90 while passageway 70 is connected through passageways 94 and 95 to the pressure chamber 96 behind the other end of the plunger.

With the coupling rotating, for example, in the direction X so as to create a higher pressure in passageway 69 than in passageway 70 due to restriction to flow between these passageways by the slip control valves S as explained, pressure from the passageways 69 applied in the pressure chamber 93 will be greater than the pressure applied in the chamber 96 from the passageway 70. The plunger 90 will thus be moved to the position shown in Figures 7 and 8 to connect port 88 through the annular groove 97 of the plunger to the exhaust port 98 in which is provided a fixed fluid resistance 99 from which fluid discharges and returns by suitable means to the reservoir 57, the port 87 at this time being blocked by the plunger. The resistance 99 is proportioned to permit a continuous predetermined escape of fluid from the passageway 70 which is made up by the supply from the pump 56 entering the passageway 70 through the check valve 66 while maintaining the minimum pressure in the circuit established by the relief valve 61. When the coupling is rotating in the opposite direction Y the pressure will then be higher in the passageway 70 with the result the plunger 90 will be shifted to connect passageway 69 to the resistance 99 while blocking off passageway 70 at the port 88, the pump 56 then supplying fluid through the check valve 65 to make up that discharged through the resistance 99. In this way fluid is continuously circulated through the coupling by the pump 56 for either direction of rotation to carry away heat developed in the coupling and maintain proper operating temperatures in the fluid pressure system.

What is claimed is:

1. A hydraulic coupling for yieldingly connecting a source of power and a load comprising, a rotatable impeller element, a rotatable runner element, a fluid pressure pump in said runner element, a closed hydraulic circuit connected to said pump, a mechanical driving connection between said impeller and said pump, and a fluid resistance serially connected in said circuit to restrict flow of fluid therein to cause said impeller to yieldingly drive said runner comprising a pair of control valves in said runner element, control plungers in said valves disposed for movement radially of the axis of rotation of said impeller, and resilient means to normally urge said plungers toward the axis of rotation of said runner element so that the radial position of said plungers is determined by the rate of rotation of said runner to control the slip in said coupling.

2. In a power transmission for conveying power from a prime mover to a member to be driven, a hydraulic coupling comprising an impeller driven by said prime mover and a runner connected to the member to be driven, a fluid pressure pump in said runner having a series of piston plungers, an actuating cam on said impeller for sequentially actuating said plungers in pumping action, a series of pressure chambers behind said plungers, intake and exhaust ports associated with each of said plungers, and valve means in said plungers for alternately connecting one or the other of said ports to said chambers, a closed fluid pressure circuit between said intake and exhaust ports for circulation of fluid therebetween upon reciprocation of said plungers by said cam, fluid resistance means in said circuit to restrict the circulation of fluid therein to cause a yielding driving action between said impeller and said runner, and a source of fluid pressure connected to said intake ports to maintain a supply of fluid pressure in said circuit.

3. In a power transmission coupling, impeller and runner members, a fluid pressure pumping device in one of said members, a mechanical driving connection between the other of said members and said pump operative to actuate said pump by the relative movement of said impeller and runner members, a closed fluid pressure circuit connected to said pumping means, a variable fluid resistance in said circuit to oppose the driving of said pump by said impeller, and means for automatically varying said fluid resistance in response to speed variations in said coupling so as to change the relative slip between said impeller and said runner, a source of fluid pressure connected to said circuit to maintain a predetermined minimum pressure therein, and a restricted fluid discharge opening in said pumping device to discharge a predetermined volume of fluid continuously from said pump to dissipate heat generated in the fluid in said closed circuit.

4. In a fluid pressure power transmission, a hydrostatic slip coupling comprising a driving member, a driven member, a fluid pressure pump in one of said members, mechanical driving means interconnecting said pump and the other of said members, a closed fluid pressure circuit connected to the intake and exhaust ports of said pump, valve control means in said pump effective to reverse the intake and exhaust ports thereof upon change in direction of relative rotation of said driving and driven members, a slip control valve means serially connected in said closed circuit adapted to restrict flow therein to cause said driving element to yieldingly rotate said driven member, a source of fluid pressure, and fluid pressure control means for automatically connecting said source of fluid pressure to the intake ports of said pumping means for either direction of relative rotation of said members.

5. In a fluid pressure power transmission, a hydrostatic slip coupling comprising a driving member, a driven member, a fluid pressure pump in one of said members, mechanical driving means interconnecting said pump and the other of said members, a closed fluid pressure circuit connected to the intake and exhaust ports of said pump, valve control means in said pump effective to reverse the intake and exhaust ports thereof upon change in direction of relative rotation of said driving and driven members, a slip control valve means serially connected in said closed circuit adapted to restrict flow therein to cause said driving element to yieldingly rotate said driven member, a source of fluid pressure, fluid pressure control means for automatically connecting said source of fluid pressure to the intake ports of said pumping means for either direction of relative rotation of said members, and further fluid pressure control means operable by the difference in pressure at the intake and exhaust ports of said pumping means for automatically connecting the intake port of said pumping means to discharge resistance for the escape of a predetermined volume of fluid from said closed circuit to remove heat developed in said pump.

6. In a hydraulic coupling for yieldingly interconnecting a driving and driven member, a series of piston plungers in said driven member, intake and exhaust ports associated with said plungers, valving means associated with each of said plungers for alternately connecting said intake and exhaust ports to pressure chambers in said driven member behind said plungers, a closed hydraulic circuit for interconnecting said ports, slip control valves serially connected in said circuit to restrict fluid flow therein comprising radially disposed plungers yieldingly urged inwardly of the axis of rotation of said driven member and movable radially outwardly in response to the rate of rotation of said driven member, so that fluid flow in said circuit interconnecting said intake and exhaust ports may be increased with increase of speed of rotation of said coupling and decreased with decrease of speed of rotation of said coupling, and mechanical actuating means for said plungers operated by said driven member to operate said pistons to circulate fluid in said circuit while yieldingly restricting relative rotation of said driving and driven members.

7. In a power transmission coupling, impeller and runner members, a fluid pressure pumping device in one of said members, a mechanical driving connection between the other of said members and said pump operative to actuate said pump by the relative movement of said impeller and runner members, a closed fluid pressure circuit connected to said pump, means for determining the rate of fluid transference through the circuit including a plurality of radially shiftable centrifugally operable resistance means interposed in the circuit, valve means establishing compression and expansion areas in the closed circuit and an auxiliary pressure supply circuit coupled with the closed fluid pressure circuit at opposite sides of the resistance means for maintaining a prescribed pressure within the expansion areas of the system in either direction of relative movement of the impeller and runner members.

8. In a power transmission coupling, impeller and runner members, a fluid pressure pumping device in one of said members, a mechanical driving connection between the other of said members and said pump operative to actuate said pump by the relative movement of said impeller and runner members, a closed fluid pressure circuit connected to said pump, means for determining the rate of fluid transference through the circuit including a plurality of radially shiftable centrifugally operable resistance means interposed in the circuit, an auxiliary pressure supply circuit coupled with the closed fluid pressure circuit at opposite sides of the resistance means for maintaining a prescribed pressure within the system, the resistance means providing a high pressure side and a low pressure side within the closed circuit, a bleeder conduit, and control means actuable by the pressure in the high pressure side for coupling the low pressure side of the circuit to said bleeder.

9. A hydraulic mechanism of the character described, including reversably operable pumping means and a transferring conduit system including a pair of conduit members interchangeably effective as high or low pressure conduits, a resistance means in the transferring circuit for determining the relative pressures of the conduits in one direction or the other of operation of the pumping means, means for continuously supplying fluid under pressure to the circuit, and means for effecting a limited discharge of fluid from the low pressure side of the circuit irrespective of the direction of operation of the pumping means, said means including a shuttle valve, means coupling opposite terminii of the shuttle valve with the pressure conduits whereby the position of the valve will be determined by the pressure in the high pressure conduit, an exhaust connection, and auxiliary discharge ports from the pressure conduits alternatively couplable by the valve to the exhaust connection, said ports being so positioned that in either direction of shifting of the shuttle valve by high pressure in one of the conduits the port of the opposite conduit will be coupled by way of the valve to the exhaust.

10. A multi-cylinder pumping mechanism of the character described, including a pump body having a multiplicity of closed end pump cylinders formed therein, plungers slidable in the cylinders having terminal piston portions and intermediate valve groove portions, a first series of fluid conduits extending from the terminal portions of the several cylinders to intermediate portions of remote cylinders in the pump body, a pair of additional conduits coupled with each cylinder in spanning relation to the connection of the cylinder conduit therewith whereby on reciprocation of the pump plunger of an individual cylinder, said conduits will be alternately coupled by the valve portion thereof with the end conduit of a remote cylinder, means for maintaining a basic pressure in the pair of conduits, and additional means effective during operation of the pump for effecting a differential in pressure between said conduits whereby pressure is built up in one of said hydraulic conduits by successive actuation of the plungers toward the closed ends of the cylinders.

11. A multi-cylinder pumping mechanism of the character described, including a pump body having a multiplicity of closed end pump cylinders formed therein, plungers slidable in the cylinders having terminal piston portions and intermediate valve groove portions, a first series of fluid conduits extending from the terminal portions of the several cylinders to intermediate portions of remote cylinders in the pump body, a pair of additional conduits coupled with each cylinder in spanning relation to the connection of the cylinder conduit therewith whereby on reciprocation of the pump plunger of an individual cylinder, said conduits will be alternately coupled by the valve portion thereof with the end conduit of a remote cylinder, means for maintaining a basic pressure in the pair of conduits, additional means effective during operation of the pump for effecting a differential in pressure between said conduits whereby pressure is built up in one of said hydraulic conduits by successive actuation of the plungers toward the closed ends of the cylinders, an undulating cam simultaneously engaging all of said plungers for controlling the position thereof, the contour of the cam being such as to effect differential positioning of hydraulically connected pairs of plungers, and means for effecting continuous relative rotary movement of the cam and pump body for effecting successive corresponding movements of the plungers.

12. In a machine tool or the like, the combination with a power source and a driven member, of a yieldable coupling intervening said parts, said coupling including a runner carried by the driven member, said runner having a circumferential series of axially extending bores formed therein, said bores being closed at one end, a series of plungers each slidably mounted in one of the bores, the plungers projecting beyond the bores, an undulating cam actuable by the power source and disposed for simultaneous engagement with the projecting portions of all the plungers, a hydraulic conduit extending from the closed end of each bore to an intermediate portion of a remotely situated bore, each of said plungers having an annular groove of width to remain in communication with the conduit connection to the intermediate portion of the bore at all points in the stroke of said plunger, a first hydraulic pressure line coupled with all of the bores at a point intermediate each individual bore conduit and the end of the bore, a second hydraulic pressure line coupled with all of the bores at a more remote point, whereby during reciprocation the grooves of the plungers will alternately couple the respective bore terminal conduits with one or the other of said hydraulic pressure lines, and means for maintaining a pressure condition in both said first and second series of pressure lines whereby there will be a hydraulic reaction urging the several plungers into engagement with the cam irrespective of the plunger effected conduit couplings thereof.

13. In a machine tool or the like, the combination with a power source and a driven member, of a yieldable coupling intervening said parts, said coupling including a runner carried by the driven member, said runner having a circumferential series of axially extending bores formed therein, said bores being closed at one end, a series of plungers each slidably mounted in one of the bores, the plungers projecting beyond the bores, an undulating cam actuable by the power source and disposed for simultaneous engagement with the projecting portions of all the plungers, a hydraulic conduit extending from the closed end of each bore to an intermediate portion of a remotely situated bore, each of said plungers having an annular groove of width to remain in communication with the conduit connection to the intermediate portion of the bore at all points in the stroke of said plunger, a first hydraulic pressure line coupled with all of the bores at a point intermediate each individual bore conduit and the end of the bore, a second hydraulic pressure line coupled with all of the bores at a more remote point, whereby during reciprocation the grooves of the plungers will alternately couple the respective bore terminal conduits with one or the other of said hydraulic pressure lines, means for maintaining a pressure condition in both said first and second series of pressure lines, and resistance means interconnecting the first and second hydraulic pressure lines whereby on relative rotation of the cam and runner a high pressure condition will be created in one of the lines by the compression action of the successive plungers.

14. In a machine tool or the like, the combination with a power source and a driven member, of a yieldable coupling intervening said parts, said coupling including a runner carried by the driven member, said runner having a circumferential series of axially extending bores formed therein, said bores being closed at one end, a series of plungers each slidably mounted in one of the bores, the plungers projecting beyond the bores, an undulating cam actuable by the power source and disposed for simultaneous engagement with the projecting portions of all the plungers, a hydraulic conduit extending from the closed end of each bore to an intermediate portion of a remotely situated bore, each of said plungers having an annular groove of width to remain in communication with the conduit connection to the intermediate portion of the bore at all points in the stroke of said plunger, a first hydraulic pressure line coupled with all of the bores at a point intermediate each individual bore conduit and the end of the bore, a second hydraulic pressure line coupled with all of the bores at a more remote point, whereby during reciprocation the grooves of the plungers will alternately couple the respective bore terminal conduits with one or the other of said hydraulic pressure lines, means for maintaining a pressure condition in both said first and second series of pressure lines, and variable resistance means interconnecting the first and second hydraulic pressure lines whereby on relative rotation of the cam and runner a high pressure condition will be created in one of the lines by the compression action of the successive plungers.

15. In a machine tool or the like, the combination with a power source and a driven member, of a yieldable coupling intervening said parts, said coupling including a runner carried by the driven member, said runner having a circumferential series of axially extending bores formed therein, said bores being closed at one end, a series of plungers each slidably mounted in one of the bores, the plungers projecting beyond the bores, an undulating cam actuable by the power source and disposed for simultaneous engagement with the projecting portions of all the plungers, a hydraulic conduit extending from the closed end of each bore to an intermediate portion of a remotely situated bore, each of said plungers having an annular groove of width to remain in communication with the conduit connection to the intermediate portion of the bore at all points in the stroke of said plunger, a first hydraulic pressure line coupled with all of the bores at a point intermediate each individual bore conduit and the end of the bore, a second hydraulic pressure line coupled with all of the bores at a more remote point, whereby during reciprocation the grooves of the plungers will alternately couple the respective bore terminal conduits with one or the other of said hydraulic pressure lines, means for maintaining a pressure condition in both said first and second series of pressure lines, resistance means interconnecting the first and second hydraulic pressure lines whereby on relative rotation of the cam and runner a high pressure condition will be created in one of the lines by the compression action of the successive plungers, and means for automatically effecting an exhaust bleeding from the lower pressure line.

16. In a machine tool or the like, the combination with a power source and a driven member, of a yieldable coupling intervening said parts, said coupling including a runner carried by the driven member, said runner having a circumferential series of axially extending bores formed therein, said bores being closed at one end, a series of plungers each slidably mounted in one of the bores, the plungers projecting beyond the bores, an undulating cam actuable by the power source and disposed for simultaneous engagement with the projecting portions of all of the plungers, a hydraulic conduit extending from the closed end of each bore to effect an out of phase continuous variable positioning thereof, spaced plungers having a substantially 90° out of phase relationship, a hydraulic conduit extending from the closed end of each bore to an intermediate portion of a spaced bore whose plunger is in substantially 90° out of phase relationship with the plunger of the connected bore, each of said plungers having an annular groove of width to remain in communication with the conduit connection to the intermediate portion of the bore at all points in the stroke of said plunger, a first hydraulic pressure line coupled with all of the bores at a point intermediate each individual bore conduit and the end of the bore, a second hydraulic pressure line coupled with all of the bores at a more remote point, whereby during reciprocation the grooves of the plungers will alternately couple the respective bore terminal conduits with one or the other of said hydraulic pressure lines, and means for maintaining a pressure condition in both said first and second series of pressure lines whereby there will be a hydraulic reaction urging the several plungers into engagement with the cam irrespective of the plunger effected conduit couplings thereof.

HANS ERNST.

REFERENCES CITED

The following references are of record in the file of this patent:

UNITED STATES PATENTS

| Number | Name | Date |
|---|---|---|
| 1,245,412 | Wheeler | Nov. 6, 1917 |
| 2,025,472 | Perry | Dec. 24, 1935 |
| 2,050,836 | Graham | Aug. 11, 1936 |
| 2,173,856 | Orshansky | Sept. 26, 1939 |
| 2,408,574 | Morris | Oct. 1, 1946 |